United States Patent [19]

Kilsdonk et al.

[11] 4,361,489

[45] Nov. 30, 1982

[54] DEVICE FOR FILTERING A LIQUID AND A SPINNING ASSEMBLY PROVIDED WITH SUCH A FILTER

[75] Inventors: Harley Kilsdonk, Zevenaar; Frits Linde, Arnhem; Petrus L. Schippers, De Steeg, all of Netherlands

[73] Assignee: Akzona, Incorporated, Asheville, N.C.

[21] Appl. No.: 160,200

[22] Filed: Jun. 17, 1980

[30] Foreign Application Priority Data

Jun. 19, 1979 [NL] Netherlands ........................ 7905055

[51] Int. Cl.³ ............................................. B01D 25/18
[52] U.S. Cl. ..................................... 210/780; 210/330;
210/350; 210/356; 210/388; 210/405; 264/176 F; 425/464; 425/185; 425/197
[58] Field of Search ............... 210/510, 342, 343, 344, 210/345, 323, 350, 352, 453, 780, 171, 251, 330, 356, 388, 456, 405; 425/464, 185, 197; 264/176 F

[56] References Cited

U.S. PATENT DOCUMENTS

| | | | |
|---|---|---|---|
| 2,887,230 | 5/1959 | Sicard | 210/510 |
| 3,353,211 | 11/1967 | Heijnis | 425/464 |
| 3,387,630 | 6/1968 | Routson | 210/350 |
| 3,724,064 | 4/1973 | Mott | 425/464 |
| 3,747,769 | 7/1973 | Brumfield | 210/350 |
| 3,762,854 | 10/1973 | Kilsdank | 425/464 |
| 3,788,486 | 1/1974 | Bergstrom | 210/510 |
| 4,022,694 | 5/1977 | Fruman | 210/350 |
| 4,039,452 | 8/1977 | Fernandez | 210/352 |
| 4,093,548 | 6/1978 | Sperkenberg et al. | 210/350 |
| 4,096,069 | 6/1978 | Postavnichev et al. | 210/342 |

*Primary Examiner*—David R. Sadowski
*Attorney, Agent, or Firm*—Antonelli, Terry & Wands

[57] ABSTRACT

A device for filtering a liquid, particularly molten polymer, removes incompletely molten polymer, foreign matter, aggregates of various additives and the like from the molten polymer prior to further processing of the liquid such as extrusion through a spinneret plate. The device comprises a housing provided with a liquid inlet and a liquid outlet and, positioned between the inlet and the outlet, a filter pack built up of a number of filtering disks and supporting disks. The disks are so arranged the liquid to be filtered is caused to flow between a center portion and an outer surface of the filter pack. On the filter pack there is placed a piston for applying a compressive pressure to the pack. The piston is displaced and acts to compress the filter pack on a liquid supply side under the influence of the pressure of the liquid to be filtered. In the device between a zone upstream and a zone downstream of the piston there is formed a liquid passage that provides a pressure drop in the liquid of at least 25 kPa.

15 Claims, 10 Drawing Figures

DEVICE FOR FILTERING A LIQUID AND A SPINNING ASSEMBLY PROVIDED WITH SUCH A FILTER

This invention relates to a device for filtering a liquid, i.e. a molten polymer, which comprises a housing having a liquid inlet and a liquid outlet and a filter pack built up of a number of filtering disks positioned between the inlet and outlet, the filter pack being made up to allow the liquid to be filtered to flow between a core and an outer surface of the filter pack and means for compressing the filtering disks together with a piston.

A filter device having a filter pack is known from the U.S. Pat. Nos. 3,536,200 and 4,096,069. With these known devices the filter pack comprises a large number of stacked annular disks, which are alternately formed by a filtering disk and a supporting disk.

Each filtering disk has a surface with such fine orifices, for instance a filter gauze, that the disk acts as a filter for the liquid to be processed. Each supporting disk consists of such coarse mesh supporting gauze that this disk does not act as a filter for the liquid to be processed, which liquid flows through it substantially parallel to the plane of the supporting gauze. The liquid to be filtered is fed to the outer circumference of a stack of disks forming a filter pack and subsequently flows substantially in radial direction through the internal space in the supporting gauzes parallel to the surface of the supporting and the filtering disks. As soon as the internal space in a supporting disk is filled with liquid, the liquid will flow substantially transverse to the planes of the supporting disks and the filtering disks, so that the liquid will pass through the filtering surface of the filtering disks. After it has passed through the filtering disk, the filtered liquid will get into the next supporting disk formed by coarse mesh gauze, in which the liquid flows parallel to the surface of the supporting disk substantially in radial direction to an outlet space in the core of the filter pack. In connection with the direction of flow of the liquid this manner of filtration is often referred to as parallel filtration.

Prior to operation of the known filtering devices, the stack of alternating filtering and supporting disks are pressed together in an axial direction with the aid of a screw thread connector. With the known filtering devices using a screw thread connector the filter pack cannot be compressed to such a degree that it is still sufficiently compressed during operation and particularly after a relatively long operating time. This detracts from the basically very favourable performance of parallel filtration devices. This disadvantage to the known filtering devices will be greater as there will be need for a higher filter capacity and the diameter and the number of stacked disks is greater. Further, a great deal of accuracy need be observed during assembly when setting a pressing force of the correct magnitude with the aid of a screw thread connector. Moreover, the pressing force should not only be sufficiently great, but should also be equally high or constant in simultaneous operation of a number of these filtering devices in order to ensure that the various parallel filters may have an equally long working profile.

U.S. Pat. No. 3,322,279 describes a device for indicating the state of a filter. The pressure across the filter increases with fouling and the filter is compressed in axial direction, as a result of which a filter element endplate, which also serves to retain a spring, will also be displaced in axial direction. This axial displacement of the endplate can, via a transmission element, if required, be converted into a signal which is indicative of the state of the filter. The slit between the endplate housing and the endplate is sufficiently wide for it not to cause axial displacement of the endplate. Further, the endplate is not disposed between the liquid supply and the filter pack.

Also, U.S. Pat. Nos. 3,343,681 and 2,692,686, DE No. 1,636,118 and FR Pat. No. 2,347,078 describe filters in which the liquid to be filtered flows in radial direction through a stack of filtering disks. With the known devices described in these patents, the stack of filtering disks is compressed with the aid of a screwthreaded element.

FR Pat. No. 1,350,560 describes a filter built up of a number of alternating supporting and filtering disks.

DE Patent Specification No. 467,511 describes a different type of filter, viz. a fuel filter, which is formed by the successive slits between the windings of a helical spring. As fuel is sucked in, the spring is compressed in axial direction, as a result of which the slits between the windings of the helical spring will narrow. When suction is stopped, the slits will widen again.

The invention has for its object to provide a filtering device of the type indicated above which no longer displays the aforementioned disadvantages. The filtering device is characterized according to the invention in that on the filter pack there is placed a pressure element, in the form of a piston, which is displaced and which compresses the filter pack on the liquid supply side under the influence of the liquid pressure, and between the zones upstream and downstream of the piston there is formed such a liquid passage that across the passage a pressure drop may be brought about in the liquid of at least 25 kPa, for instance 300-100 kPa (Pa=Pascal). A preferred embodiment according to the invention is characterized in that the passage is substantially formed by a gap around the outer circumference of the piston, which gap communicates with a gap formed between the housing and the outer circumferential surface of the filter pack.

An effective embodiment according to the invention is further characterized in that a central stem connected to the piston is placed inside the annular filter pack. This stem contains a number of axial channels for the liquid. A filtering device in which the filter pack is substantially made up of a pack of annular alternating filtering disks and supporting disks, which supporting disks are provided with passages and formed by, for instance, coarse mesh gauze, is characterized according to the invention in that the successive supporting disks are sealed alternately on the outer circumferences and on the inner circumferences. According to the invention, the closure of each of the coarse mesh supporting gauzes is in the form of a preferably solid rim forming the outer or the inner circumference of one of the supporting gauzes. This rim is attached to the supporting gauze and has a thickness which is virtually equal to the thickness of the supporting gauze. The supporting gauzes are so constructed that they permit a flow of liquid therethrough which is substantially parallel to the plane of the supporting gauze. In the filtering device according to the invention, the stacked disks consisting alternately of a filtering gauze and a supporting gauze are automatically pressed together sufficiently tightly. Also in filtering devices having a high capacity, comprising a stack of a large number of filtering and supporting disks the invention makes it possible in a simple manner to attain the desired compression.

The supporting gauzes according to the invention are provided with a solid sealing rim only either at their inner circumference or at their outer circumference, so that each supporting gauze has at its outer circumference or at its inner circumference a free and open rim formed by the coarse mesh gauze. In spite of the free inner or outer rim of the coarse supporting gauze being in contact with its neighboring filter gauze only in a relatively small number of places, it has according to the invention surprisingly been found that compression of the entire package can be satisfactorily realized. A favorable embodiment of the filtering device is characterized according to the invention in that the filter pack is built up of the coarse mesh supporting gauzes alternated by groups of filtering gauzes whose fineness increases in the direction of the flow of the liquid.

The filtering device according to the invention is particularly suitable to be used in a spinning assembly which is employed for instance for spinning molten polymers, such as polyamides, polyesters, polypropylene and like liquids, or the spinning of liquids in which the polymer is dissolved. The filtering device according to the invention is preferably used for filtering liquids having a viscosity higher than 10 Pa.s (Pascal.second). It has been found that use of the filtering device according to the invention in a spinning assembly for the melt spinning of synthetic polymers, makes it possible for the running time of the assembly, i.e. the admissible, uninterrupted operating time, to be increased to several months while maintaining the desired high quality of the yarn to be spun. This is a remarkable improvement, considering that the spinning assemblies known so far permit a running time of only a few days up to a few weeks. Further, the filtering device according to the invention is so constructed that it has practically no dead pockets, i.e. spots permitting accumulation of degraded polymer.

It should be added that from FIG. 1 of U.S. Pat. No. 3,353,211 a spinning assembly is known having a filter pack made up of a series of superimposed annular filter gauzes which are in alternating arrangement with metal plates. Also in this assembly the molten polymer to be spun enters the filter pack at its cylindrical outer circumference and flows in radial direction along the plane of a filter gauze and between two metal plates positioned on either side of the filter gauze.

The filtered polymer is collected in the core of the annular filter pack and passed to the spinneret. FIG. 4 of U.S. Pat. No. 3,353,211 shows a modified embodiment of the filter pack, which consists of alternately coarse and fine mesh filter gauzes through which the liquid flows substantially perpendicular to their plane. Although the feeding of the liquid past the outer circumferential surface of the filter pack of this known spinning assembly must be considered a rather attractive feature, it has been found that the performance of this filter pack, and more particularly the axial compression thereof, can still be improved upon.

Mention should also be made of British Patent Specification No. 755,954 describing a melt spinning apparatus wherein the hydraulic pressure of the melt inside the pack acts to seal all the joints between the components forming the exterior surface of the pack. This construction comprises an internal lid which can be axially displaced inside the housing under the influence of the pressure of the liquid against a gasket provided between the internal lid and a rim which is formed integral with the housing. The filtering element consists of a sand pack supported by a few gauzes. On the polymer feed side of the apparatus the sand pack supports a distributor plate, which is provided with passages for the polymer and placed in close circumferential contact with the wall of the housing. Although the principle of sealing by polymer pressure, as described in British Patent Specification No. 755,954 is in itself quite satisfactory, the construction shown in this British patent specification is not designed for and is not suitable for the compression of the filter; the friction between, on the one hand, the distributor plate, and the sand filter pack and the wall of the housing, on the other hand, is fairly high and the displacement of the distributor plate resting on the sand pack may cause the sand to rise, both of which may lead to difficulties.

The invention will be further described with reference to the accompanying drawings wherein.

Figure 1:
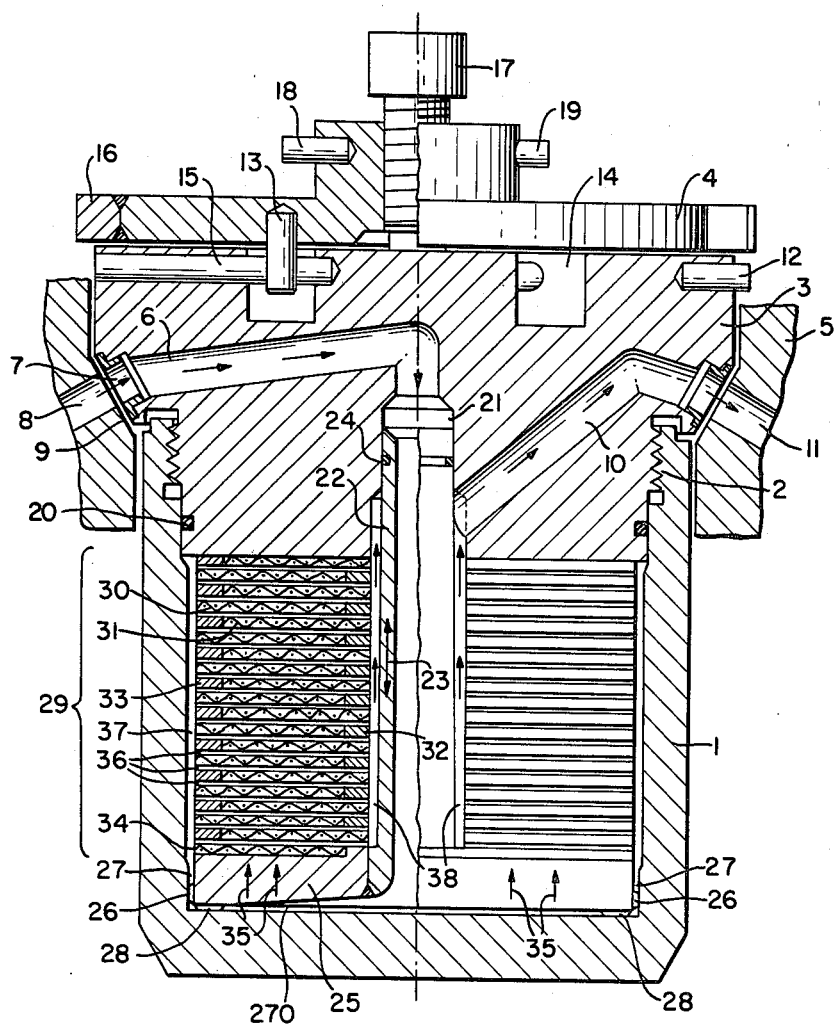
FIG. 1 is a partially sectional view of a filter device according to the invention for a viscous liquid.
Figure 2:
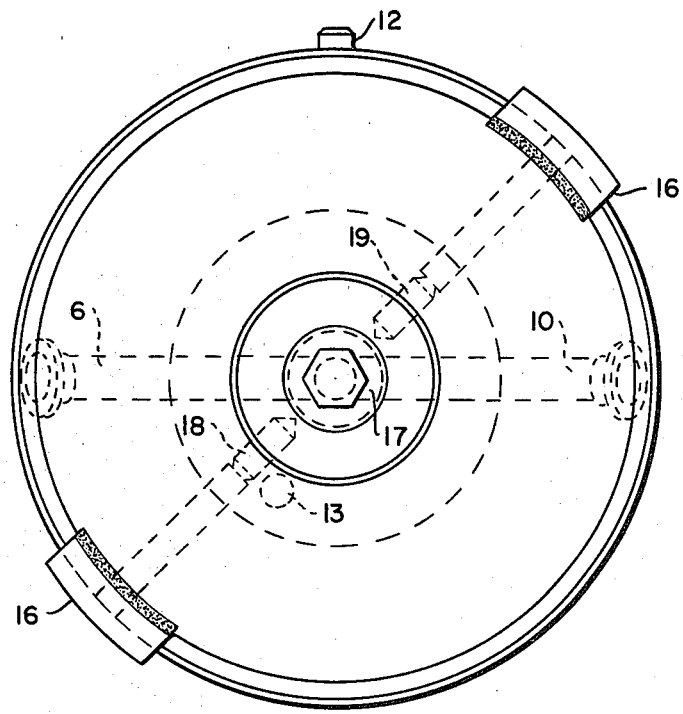
FIG. 2 is a plan sectional view of the filter device shown in FIG. 1.

The filtering device according to FIGS. 1 and 2 has a cylindrical pot-shaped housing 1 on which there is screwed with a threaded connector 2 an internal lid 3. On the internal lid 3 there is a lid 4 for securing the filtering device in a frame 5, which is only partly shown.

The internal lid 3 is provided with a liquid feed channel 6 for the liquid to be filtered, which channel has its inlet in a conical part 7 of the outer circumference of the lid 3. The inlet of the feed channel 6 in the internal lid 3 connects to an identical inlet channel 8 in the conical seat 9 provided in the frame 5. Diametrically opposite the feed channel 6 the internal lid 3 contains a discharge channel 10 for the filtered liquid which connects to an identical outlet channel 11 in the frame 5. The housing 1 closed by the screwed internal lid 3 can be placed in the appropriate angular position in the frame 5 with the aid of a dowel pin 12, the outer surface of the conical part 7 of the internal lid 3 being placed on the conical seat 9 of the frame 5.

Subsequently, the securing lid 4 is placed on the internal lid 3 with the pin 13 being inserted in the groove 14. Next, the securing lid 4 is turned through such an angle as will cause the pin 13 to abut against a stop pin 15. In this last-mentioned position, lugs 16 on the securing lid 4 are twisted as a bayonet fitting into the frame 5 under rims not shown in the drawing. By tightening a locking screw 17 the cone 7 of the internal lid 3 can be pressed sufficiently tight against the conical seat 9 in the frame 5.

Figure 5:
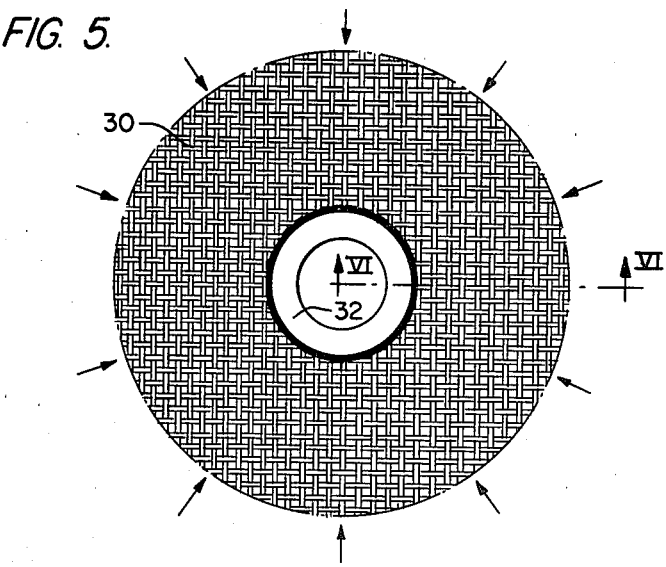
FIG. 5 shows a coarse mesh supporting gauze provided at its inner circumference with a sealing rim.
Figure 6:
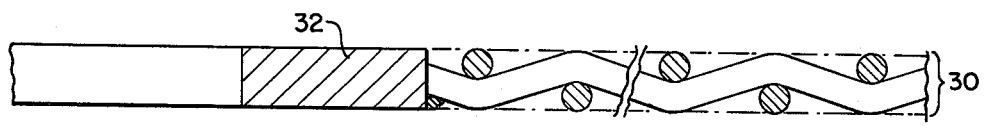
FIG. 6 is a sectional view along the line VI—VI in FIG. 5.
Figure 7:
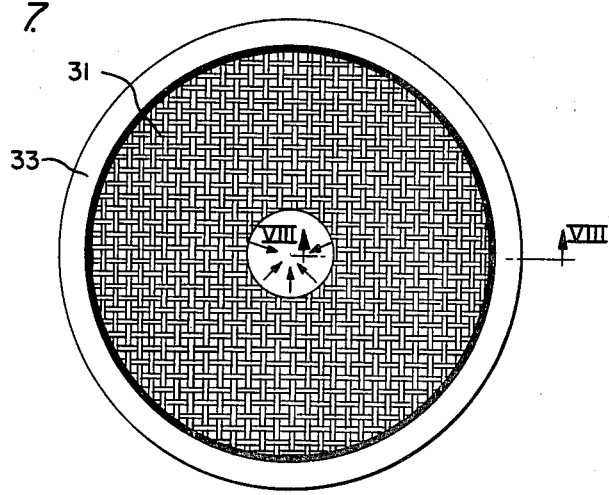
FIG. 7 shows a coarse mesh supporting gauze provided at its outer circumference with a sealing rim.
Figure 8:
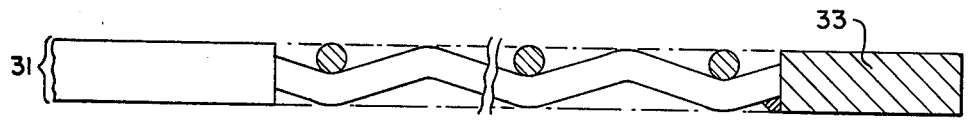
FIG. 8 is a sectional view along the line VIII—VIII in FIG. 7.

Projecting pins 18 and 19 make it possible for the filtering device so to be handled that during assembling or disassembling it can be placed into the frame or be removed from it bodily. For clarity a few parts in FIG. 1 are shown in a displaced position, viz. the lugs 16, the stop pin 15, and the pins 12, 13 and 18. Between the housing 1 and the internal lid 3 is a sealing ring 20. In the center of the internal lid 3 the bore of the liquid feed channel 6 widens (as shown by reference numeral 21) for receiving a stem 22 which is axially slidable in the directions indicated by the arrow 23. Between the outer wall of the stem 22 and the wall of the bore 21 there is a seal 24. Attached to the lower end of the stem 22 is a piston 25. The piston 25 is centered inside the housing by means of a number of centering fins 26 on its outer circumference. As a result, a uniform width is obtained for the gap 27 between the outer circumference of the piston 25 and the inside of the housing 1. At the bottom of the piston 25 there are provided a number of circumferentially distributed spacer fins 28. Between the upper side of the piston 25 and the lower side of the internal lid 3 and around the stem 22 there is the annular filter pack generally indicated by the reference numeral 29. As can be seen more distinctly in FIG. 3, the filter pack 29 is formed by a large number of annular supporting disks 30 and 31 of a coarse mesh supporting gauze. At their inner circumference the supporting disks 30 (see FIGS. 5 and 6) are provided with a closure in the form of a solid rim 32, which is welded to the coarse mesh gauze. At their outer circumference the supporting disks 31 (see FIGS. 7 and 8) are provided with a closure in the form of a solid rim 33, which is welded to the supporting gauze. At its lower end the filter pack 29 comprises the coarse mesh supporting gauze 34, which is not welded to a solid rim, but closed at its inner circumference as a result of its bearing against a rim.

Between every two supporting disks 30 and 31 there is a filtering disk 36 of fine mesh filter gauze.

In operation of the filter device, the liquid to be filtered is supplied under high pressure through the feed channel 6 in the direction indicated by the arrow and via the hollow stem the liquid passes the piston 25. Then the liquid first flows in radial directions through the gap 270 and subsequently upwards through the annular gap 27. The gaps 27 and 270 should have such a previously calculated width that there will be a pressure drop of at least 25 kPa, preferably 300–1000 kPA (Pa=Pascal) across the piston. As a result, the piston 25 will be forced upwards in the direction indicated by the arrows 35 so that the whole filter pack is sufficiently compressed. After leaving the narrow gap between the circumference of the piston and the housing, the liquid flows into a communicating annular space 37 between the outer circumference of the filter pack 29 and the housing 1. From the space 37 the liquid enters the filter pack 29 and flows into the supporting gauzes 30, which are open at their outer circumference and closed at their inner circumference, in the directions indicated by the arrow.

As soon as the space in the coarse mesh gauze forming the supporting disks 30 is filled with liquid, the liquid will start flowing through the fine mesh filtering disks 36 in a direction substantially perpendicular to the plane of the filtering disks 36. After the filtered liquid has passed through such a filtering disk 36, it will flow into the coarse mesh of a supporting disk 31, which is closed at its outer circumference but open at its inner circumference. From the various supporting disks 31, the filtered liquid will, therefore, flow into the annular discharge space 38 between the cylindrical inner surface of the filter pack 29 and the outer circumferential surface of the stem 22. The filtered liquid leaves the filtering device by way of the discharge channel 10, which ends in the outlet 11 in the frame. The filter pack 29 drawn in the FIGS. 1 and 3 may contain, for instance, 60 filtering disks 36 and 60 alternating supporting disks 30 and 31.

In their compressed state the filtering disks 36 may have a thickness of about 0,5–2,5 mm; whereas the supporting disks 30 and 31 may have a thickness of about 1–3 mm. The outer and the inner diameter of the filter pack 29 may, for instance, be about 130 mm and 30 mm, respectively. The height of the gap 27 may, for instance, be 15 mm, whereas its width may, for instance, be 1 mm, depending on the process conditions.

In this construction the radial width of the solid rims 32 and 33 is preferably at least about 5–8 mm; whereas their thickness should not deviate more than ±10% from the thickness of the supporting gauzes.

The coarse mesh supporting gauze may, for instance, be of the type having square meshes measuring 1,5×1,5 mm, a wire thickness of 1,0 mm and a gauze thickness of 2,0 mm. The fine filter gauzes 36 are formed by fine mesh filter gauze having square meshes of, for instance, 0,05×0,05 mm, a wire thickness of 0,035 mm and a gauze thickness of 0,07 mm.

The pressure drop across said piston and the slot-shaped gaps 27 and 270 can be calculated with the formula:

$$\Delta p = 12 \cdot \eta \cdot \phi_v \cdot \frac{L}{bh^3},$$

where $\Delta_p$ is the pressure drop or pressure difference in Pascal. For instance, for the gap 27 L is the axial length in meters of the gap between the outer circumferential surface of the piston and the housing. $\eta$ is the viscosity of the liquid to be filtered in Pascal seconds, and $\phi_v$ the flow rate of the liquid in $m^3$/sec. The symbol b stands for the width in meters of the gap 27, which is practically equal to the outer circumference of the piston, and h is the radial width in meters of the gap 27 between the outer circumference of the piston and the housing.

Figure 3:
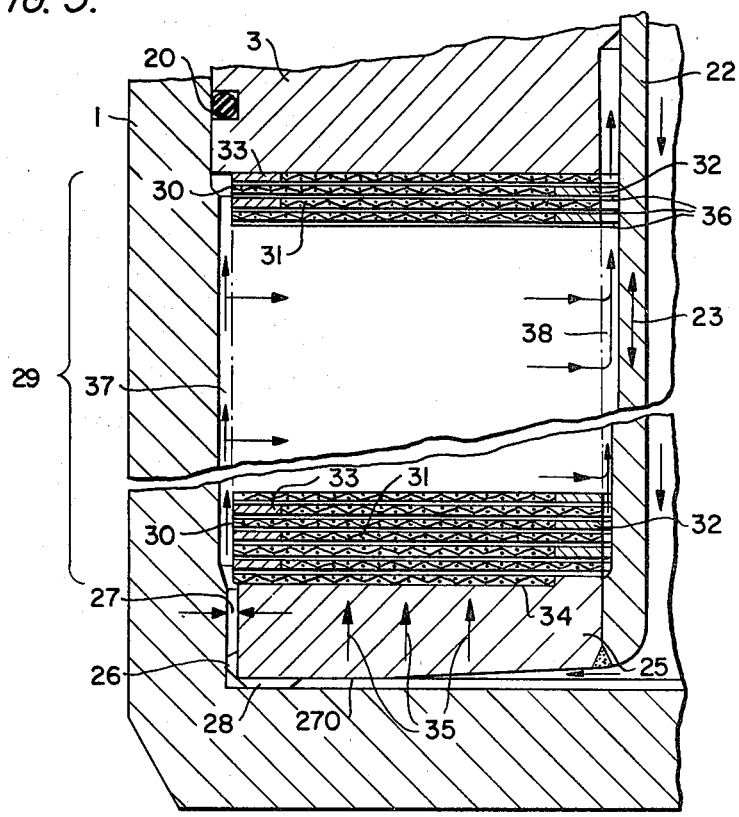
FIG. 3 shows, on an enlarged scale, a detail of the filter pack of the filter device according to FIG. 1.
Figure 4:
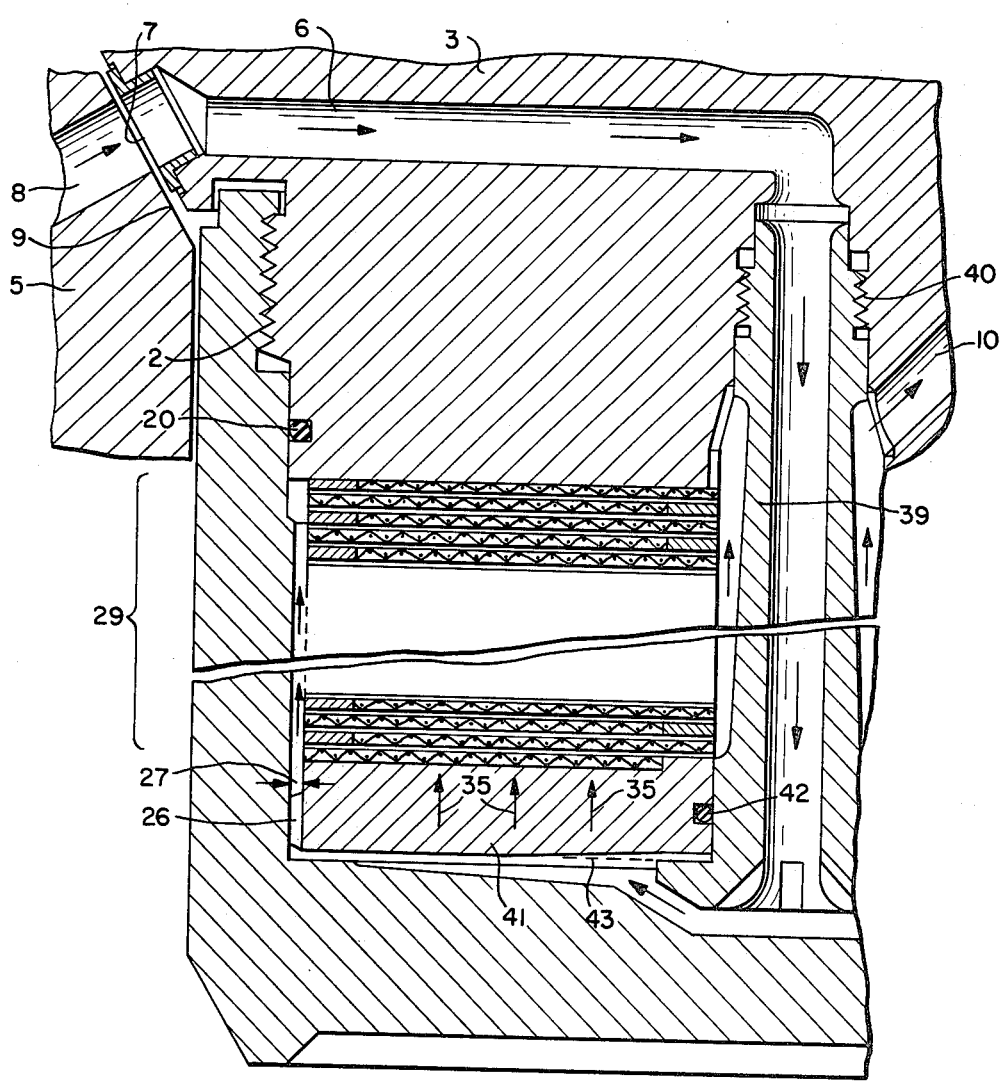
FIG. 4 illustrates another embodiment of the filter device according to FIG. 1.

FIG. 4 shows a filtering device according to the invention, which in some respects differs from the embodiment according to FIG. 3. Like parts of the two embodiments are referred to by like numerals. An important difference consists in that in the embodiment according to FIG. 4, the stem 39 is secured in the internal lid 3 by means of a screw thread 40. The piston 41 is mounted for axial movement on the lower end of the stem 39, with a sealing ring 42 being inserted. Because of the stem 39 being secured by means of a screw thread 40 the filter pack is slightly compressed already during the assembly of the filter pack, to which thus a slight pre-compression is applied. During assembly, the underside of the piston 41 rests on the lower end of the stem 39 and the position then of the underside of the piston is indicated by a dash line 43. In operation of the filtering device the piston 41 is compressed in the direction indicated by the arrows 35 as a result of the pressure drop of the liquid across the gap 27, the piston 41 being lifted from the ledge at the lower end of the stem 39.

Figure 9:
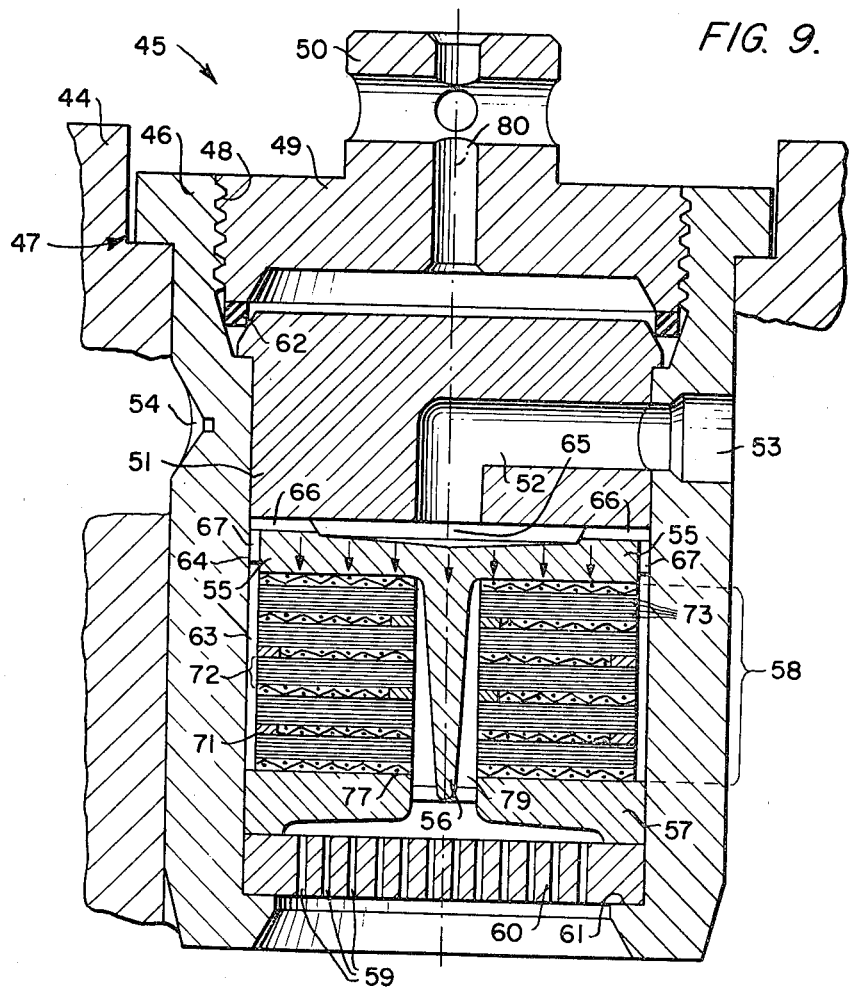
FIG. 9 is a sectional view of a spinning assembly containing another embodiment of the filter device according to the invention.

FIG. 9 is a vertical longitudinal section of part of an apparatus for melt spinning synthetic yarns or filaments, the heated frame 44 of the machine containing an exchangeable spinning assembly 45. The spinning assembly 45 has a housing 46 which is placed in the frame 44. The top of the housing 46 is closed with a threaded (the threads being shown at 48) external lid 49 provided with a lifting eye 50. Underneath the external lid 49 is the internal lid 51, which is provided with a polymer feed passage in the form of a channel 52. The channel 52 connects with a polymer feed duct (not shown) in the frame 44, which duct enters the wall of the housing 46 by way of a bore at 53. The bore 53 is sealed with some packing material and the housing is held in place in the frame by exerting a pressure on the housing at 54 by means of a bolt (not shown). Under the internal lid 51 is a piston 55 whose underside is provided with a stem 56. Between the piston 55 and an intermediate plate 57 there is a filter pack which is generally referred to by the numeral 58. The intermediate plate 57 rests on a spinneret plate 60 provided with spinning orifices 59 and resting on a ledge 61 in the bottom part of the housing. Between the spinneret plate 60 and the ledge 61 of the housing there should be provided a gasket (not shown) for sealing the bottom part of the housing. The top part of the housing may be sealed with a gasket 62 which is compressed upon the internal lid 51 being pressed upwards over a small distance under the influence of the polymer pressure.

Figure 10:
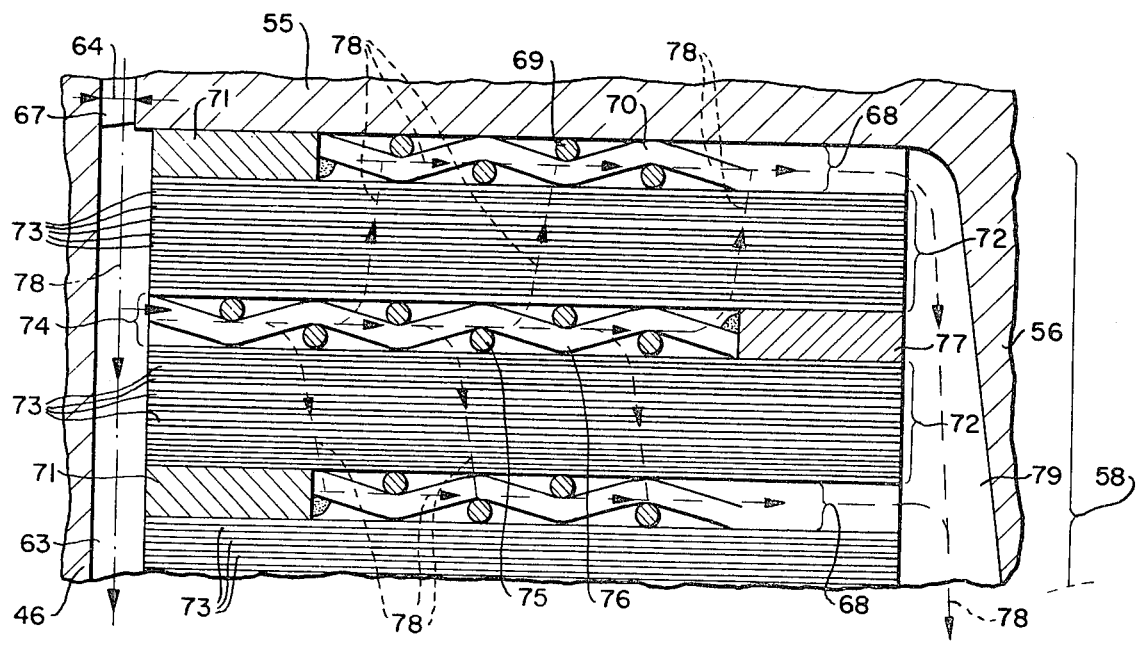
FIG. 10 shows, on an enlarged scale, the filter device of the spinning assembly according to FIG. 9.

FIG. 10 is a view on a larger scale of part of the housing 46 with the filter pack 58. It shows that between the inner wall of the housing 46 and the outer circumference of the filter pack 58 there is provided an annular polymer feed space 63 which via the gap 64 and the space 65 above the piston 55 communicates with the polymer feed channel 52 in the internal lid 51. In order to maintain sufficient clear space between the piston 55 and the internal lid 51 the upper side of the piston 55 is provided with a number of circumferentially distributed ribs 66. However, a satisfactory construction is also obtained without the ribs 66. Across the gap 64 between the outer circumference of the piston 55 and the inside of the housing 46 there is maintained a pressure drop which is chosen in accordance with prevailing process conditions. The gap 64 is maintained at its proper width over the entire circumference with the aid of a number of ribs 67 circumferentially disposed on the piston 55. From the top downwards the filter pack 58 successively comprises a coarse top supporting gauze 68 consisting of crossing metal wires 69 and 70 which are at the outer circumference welded to a solid steel ring 71, so that the coarse gauze 68 is closed at its outer circumference. Under the coarse gauze 68 is a partial pack 72 consisting of, for instance nine fine gauzes 73. Under the top partial pack 72 is again a coarse supporting gauze 74 built up of wires 75 and 76 which are welded on the inside to a solid steel inner ring 77, so that the coarse gauze 74 is closed on the core side of the filter pack. The coarse supporting gauzes 68 and 74 are of the type indicated in FIGS. 7, 8 and 5, 6, respectively.

Under the coarse supporting gauze 74 with inner ring 77 there is again a partial pack 72 of, for instance, nine fine filter gauzes 73. Under this partial pack there is again a coarse supporting gauze 68 with solid outer ring 71, etc. In the embodiment according to FIGS. 9 and 10 the complete filter pack 58 consists of 6 coarse filter gauzes 68 and 74, which are separated from each other by five partial packs 72 of fine filter gauzes 73.

In operation of the filtering device, molten polymer, for instance, polyethylene terephthalate, flows from the inlet in the outer surface of the housing into the channel 52 of the assembly at a pressure of, for instance, 10000 kPa. Under this high pressure the polymer subsequently enters the space 65 above the piston 55. The polymer subsequently enters the outer circumference of the piston 55 through the gap 64, as a result of which the piston 55 vigorously compresses the filter pack 58. Subsequently, the polymer flows through the annular space 63 between the outer circumferential surface of the filter pack and the inner wall of the housing 46. The main flow directions are indicated in FIG. 10 by dash line arrows 78. The top coarse gauze 68 being sealed at its outer circumference by a solid ring 71, the polymer cannot flow directly from the space 63 into the top coarse gauze 68. Not until it has reached the top coarse gauze 74, which is open at its outer circumference and closed only at its inner circumference by a steel ring 77, can the polymer properly move radially inwards of the filter pack 58. As soon as the polymer under said high pressure starts displacing in the plane of said coarse gauze 74, it will immediately also flow upwards and downwards through the neighboring partial packs 72 of fine filter gauzes 73, whose meshes for spinning polyester textile yarns for instance measure 0,045×0,045 mm. The coarse supporting gauzes 68 and 74 may then have a mesh size of, for instance, 1,6×1,6 mm. When upon leaving a partial pack 72 of fine filter gauzes 73 the polymer enters an adjoining coarse gauze 68, its further flow will be in radial direction. By way of various coarse gauzes 68, which are not closed at their insides by steel rings, the polymer flows into channels 79, which are formed between the stem 56 and the core of the annular filter pack 58. The stem 56 may have, for instance, a cylindrical outer circumference containing, e.g. six channels 79 which gradually widen in the direction of the flow of the polymer. At the lower end of the channels 79 the polymer is fully filtered and arrives in the space above the spinneret plate 60 over which it is evenly distributed. Subsequently, the polymer is forced through spinning orifices 59 (which are drawn on a greatly enlarged scale) in the form of filaments, which after cooling are treated in the usual way and wound into the form of a synthetic yarn package.

Within the scope of the invention various modifications may be made, the invention not being limited to application in the cylindrical assembly shown in FIG. 9 for melt spinning synthetic polymers, such as polyester, nylon, polypropylene. The invention may also be successfully applied in other spinning processes, such as the wet spinning process. The invention may further be successfully applied in a spinning apparatus for spinning synthetic yarns which each consist of at least two polymer components. For instance, it could be used for making bicomponent yarns of the sheathcore or the side-by-side type, with the one component, for instance, consisting of polyester and the other component of nylon or copolymers. For the spinning of bicomponent yarns two or more of the above-described filter packs 58 may be placed in one spinning assembly. Instead of being cylindrical, the housing 46 and the spinneret plate 60 may be oblong, more particularly rectangular, the spinneret plate being provided with an adapted orifice pattern. In the embodiment according to FIG. 9 the vertical axis of the cylindrical filter pack 58 coincides with the usually vertical axis 80 of the melt spinning assembly and the spinneret plate 60 shown in the drawing. In some other embodiment it is also very well possible for the axis of the filter pack or the axes of several filter packs not to coincide with the axis of the spinneret plate. Instead it may for instance be at right angles to the axis of the spinneret plate. For the superatmospheric pressure applied to the polymer makes it possible for the filter piston properly to compress the filter pack also in various other positions. It is very well possible for the central axis of the filter pack 15 to be positioned horizontal without affecting the favorable performance of the filtering device. The annular filter packs may have a circular circumference, but in principle it is also possible to apply an oval, square, rectangular or other polygonal circumference.

We claim:

1. A device for filtering a liquid, which comprises a housing provided with a liquid inlet and a liquid outlet and, positioned between said inlet and said outlet, a filter pack built up of a plurality of filtering disks and supporting disks, means including said disks for causing the liquid to be filtered to flow between a center portion and an outer surface of the filter pack, said device being characterized in that on the filter pack there is placed means for applying a compressive pressure to said pack, said pressure applying means including a piston which is displaced to compress the filter pack on a liquid supply side as a result of a pressure drop of at least 25 kPa in the pressure of the liquid to be filtered, and in that between a zone upstream and a zone downstream of the piston there is formed a liquid passage means for providing a pressure drop in the liquid of at least 25 kPa.

2. A device according to claim 1, characterized in that said liquid passage means is so formed that the pressure drop across the passage means is in the range of from 300 to 1000 kPa.

3. A filtering device according to claim 1 or claim 2, characterized in that said passage means is substantially formed by a gap around the outer circumference of the piston.

4. A filtering device according to claim 3, characterized in that the gap around the outer circumference of the piston communicates with a gap formed between the housing and the outer circumferential surface of the filter pack.

5. A filtering device according to claim 3, further comprising means for centering the piston within said housing so that said gap is uniformly maintained around the outer circumference of the piston.

6. A filtering device according to claim 5, wherein said means for centering the piston comprises a number of centering fins that extend outwardly from the outer circumference of the piston and which contact an inner wall of the housing.

7. A filtering device according to claim 3, further comprising means for providing another gap between the piston and said housing, said another gap being formed between an outer surface of the piston and inner end wall of the housing thereby defining a liquid passage through which the liquid to be filtered passes before entering said gap around the outer circumference of the piston and into said filter pack.

8. A filtering device according to claim 1, characterized in that the disks are annular-shaped to provide an annular filter pack and a central stem connected to the piston is placed inside the annular filter pack, said stem having a number of axial channels for passage of the liquid therethrough.

9. A filtering device according to claim 1, characterized in that the filter pack is made up of a pack of annular alternating filtering disks and supporting disks, said supporting disks being sealed alternately on the outer circumference and on the inner circumference of each disk.

10. A filtering device according to claim 9, characterized in that the supporting disks are formed by a relatively coarse supporting gauze.

11. A filtering device according to claim 9 or claim 10, characterized in that a closure of each of the coarse supporting gauzes is in the form of a rim forming the outer or the inner circumference of an alternate one of supporting gauzes, said rim being attached to the supporting gauze and having a thickness which is virtually equal to the thickness of the supporting gauze.

12. A filtering device according to claim 9 or claim 10, characterized in that the disks in the filter pack are so arranged that the pack allows a flow of liquid through the coarse mesh supporting gauzes which is substantially parallel to the plane of each supporting gauze.

13. A filtering device according to claim 9, characterized in that the filter pack is built up of said coarse mesh supporting gauzes alternated by groups of filtering gauzes whose fineness increases in the direction of flow of the liquid.

14. A filtering device according to claim 1 in combination with a spinning assembly for the production of polymeric yarns.

15. A method of filtering polymeric-containing liquids having a viscosity higher than 10 Pascal seconds in a filtering device having a housing provided with a liquid inlet and a liquid outlet and a filter pack positioned between said inlet and outlet, said filter pack being formed of a plurality of filtering disks and supporting disks arranged to allow for flow of liquid to be filtered through said pack and means for applying a compressive pressure to said pack which includes a piston displaceable to compress the filter pack as a result of a pressure drop of at least 25 kPa in the pressure of the fluid to be filtered, which comprises introducing the liquid to be filtered into said filtering device via said liquid inlet, applying liquid pressure to said piston to compress the plurality of filter disks and supporting disks and simultaneously introducing the liquid to be filtered into said filter pack disks via a liquid passage means that is formed between a zone upstream and a zone downstream of said piston,, said liquid passage means providing a pressure drop of at least 25 kPa and thereafter passing the liquid through said filter pack and to said liquid outlet.

* * * * *